United States Patent [19]

Bischel et al.

[11] 4,140,978
[45] Feb. 20, 1979

[54] METHOD AND APPARATUS FOR PRODUCING LASER RADIATION FOLLOWING TWO-PHOTON EXCITATION OF A GASEOUS MEDIUM

[75] Inventors: William K. Bischel, Menlo Park; Ralph R. Jacobs, Livermore, both of Calif.; Donald Prosnitz, Hamden, Conn.; Charles K. Rhodes, Palo Alto, Calif.; Patrick J. Kelly, Fort Lewis, Wash.

[73] Assignee: The United States of America as represented by the United States Department of Energy, Washington, D.C.

[21] Appl. No.: 792,280

[22] Filed: Apr. 29, 1977

[51] Int. Cl.$^2$ ............................................... H01S 3/22
[52] U.S. Cl. ............................................... 331/94.5 G
[58] Field of Search .................... 331/94.5 P, 94.5 G, 331/94.5 C; 356/106 LR; 350/172

[56] References Cited

U.S. PATENT DOCUMENTS

| | | | |
|---|---|---|---|
| 3,575,671 | 4/1971 | Dessus | 331/94 C |
| 3,597,695 | 8/1971 | Swain et al. | 331/94.5 C |
| 3,857,109 | 12/1974 | Piloff | 331/94.5 C |

OTHER PUBLICATIONS

Barch et al., *Optics Communications,* vol. 15, No. 3, Nov.-Dec., 1975, pp. 358-360.
Bischel et al., *Physical Review Letters,* vol. 34, No. 6, Feb. 10, 1975, pp. 300-303.
Gullberg et al., *Physica Scripta,* vol. 8, 1973, pp. 177-182.
Jacobs et al., *Applied Physics Letters,* vol. 29, No. 11, Dec. 1 1976, pp. 710-712.

*Primary Examiner*—William L. Sikes
*Attorney, Agent, or Firm*—Dean E. Carlson; R. S. Gaither; P. Martin Simpson

[57] ABSTRACT

Method and apparatus for producing laser radiation by two-photon optical pumping of an atomic or molecular gaseous medium and subsequent lasing action. A population inversion is created as a result of two-photon absorption of the gaseous species. Stark tuning is utilized, if necessary, in order to tune the two-photon transition into exact resonance. In particular, gaseous ammonia ($NH_3$) or methyl fluoride ($CH_3F$) is optically pumped by a pair of $CO_2$ lasers to create a population inversion resulting from simultaneous two-photon excitation of a high-lying vibrational state, and laser radiation is produced by stimulated emission of coherent radiation from the inverted level.

22 Claims, 3 Drawing Figures

METHOD AND APPARATUS FOR PRODUCING LASER RADIATION FOLLOWING TWO-PHOTON EXCITATION OF A GASEOUS MEDIUM

The invention described herein was made in the course of or under Energy Research and Development Administration Contract No. W-7405-ENG-48 with University of California.

BACKGROUND OF THE INVENTION

This invention relates to a method and apparatus for producing laser radiation, more particularly, for producing laser radiation by two-photon optical pumping of a gaseous medium.

In recent years, lasers have found increasing application in industry, particularly in such fields as photochemistry and laser isotope separation. This increased interest in the use of lasers has created a demand for the development of relatively efficient and economical lasers operating at different wavelengths in the optical spectrum.

One of the most efficient and economical lasers currently available is the $CO_2$ laser which produces powerful coherent radiation at wavelengths near 10.6 and near 9.6 microns. Various attempts have been made to extend the operation of the $CO_2$ laser to other wavelengths, particularly to wavelengths near 16 microns for isotope separation applications.

SUMMARY OF THE INVENTION

The present invention provides a method and apparatus for producing laser radiation by two-photon optical pumping of an atomic or molecular gaseous medium, particularly ammonia or methyl fluoride, to create a population inversion as a result of two-photon absorption by the gaseous medium, followed by stimulated emission of coherent radiation from the inverted level. Stark tuning is utilized, if necessary, to tune the two-photon transition into exact resonance.

The terms "two-photon absorption" and "two-photon excitation", as generally used in the art and as used herein, refer to the simultaneous absorption, as distinguished from sequential absorption, of two photons of frequencies $\nu_1$ and $\nu_2$ (which may be the same or different) to excite an atomic or molecular state whose energy is equal to the sum of the energies of the two photons. In simultaneous two-photon absorption, neither $\nu_1$ nor $\nu_2$ is capable, by itself, of exciting a transition in the species, whereas in sequential absorption by two photons, the first photon excites a transition to a first real energy level and the second photon excites a transition between the first energy level and a second energy level. That is, in sequential absorption of two photons, excitation takes place in two successive stages. Simultaneous two-photon absorption, on the other hand, involves a transition to an intermediate virtual energy level. The term "two-photon transition" is used herein to denote the transition corresponding to a two-photon absorption. The general theory of simultaneous two-photon absorption was initially established by Goppert-Mayer in 1931 (M. Goppert-Mayer, Ann. Phys. Leipz. 9, 273, 1931). The term "two-photon optical pumping" is therefore used herein to denote optical pumping by means of two photon sources whose frequencies are such that excitation of the gaseous lasing medium to a higher energy level is effected by simultaneous two-photon absorption. Also, the term "pumping a two-photon transition", when used herein refers to pumping an energy level excited by a two-photon transition as hereinbefore defined.

For lasing action, two-photon excitation has several advantages over successive excitation. An important advantage is that two-photon excitation is independent of intermediate state properties whereas successive excitation is dictated by the characteristics of the intermediate level, particularly such characteristics as radiative and collisional lifetimes. In addition, there is a certain amount of delay in two successive steps and such delay may prove unacceptable for lasing action.

Another advantage of two-photon optical pumping is that the photons are propagated farther into the lasing medium. This is an important factor from the standpoint of scalability. With sequential pumping, penetration of the photons into the lasing medium is restricted, thus severely limiting laser action.

Equivalent excitation with a single photon of twice the energy is also limited by penetration restriction. It is also emphasized that two-photon excitation accesses a state different from equivalent excitation with a single photon; single photon excitation involves a change in parity whereas two-photon excitation does not. Thus, two-photon optical pumping greatly extends the number of potential lasing lines.

Therefore, it is an object of this invention to provide laser radiation by two-photon optical pumping of a gaseous medium.

More particularly, it is an object of this invention to provide laser radiation by two-photon optical pumping of a molecular gaseous medium.

It is a further object of this invention to extend the operation of the $CO_2$ laser by using a pair of $CO_2$ lasers for two-photon optical pumping of a gaseous medium, particularly a molecular gaseous medium.

Another object of this invention is to provide laser radiation by two-photon optical pumping of gaseous ammonia.

Still another object of this invention is to provide laser radiation by two-photon optical pumping of gaseous methyl fluoride.

Other objects of the invention will become apparent from the following description and accompanying drawings.

DETAILED DESCRIPTION OF THE INVENTION

In accordance with the present invention, there is provided a method and means for generating laser radiation from an atomic or molecular gaseous medium characterized by an absorption spectrum wherein a final absorbing state is accessible by a two-photon transition which comprises optically pumping the two-photon transition by means of a pair of photon sources having a combined photon energy sufficient to excite the final absorbing state by two-photon absorption and cause a population inversion, and stimulating the emission of coherent radiation from the final absorbing state which is inverted with respect to lower lying levels. The sum of the two photon energies represents the maximum obtainable laser output energy. The preferred lasing medium is a molecular gas.

In one embodiment of the invention, laser radiation greater than 5 $\mu$m wavelength is generated by two-photon optical pumping of gaseous ammonia by a pair of $CO_2$ lasers operating in the 10.4 $\mu$m band.

In another embodiment of the invention, laser radiation greater than 5 $\mu$m wavelength is generated by two-photon optical pumping of gaseous methyl fluoride by a pair of $CO_2$ lasers operating in the 9.4 $\mu$m band.

If necessary, Stark tuning is used to tune the two-photon transition into exact resonance with the sum of the energies of the two excitation photons. It is well known in the art that an energy level shift may be induced by the presence of an electric field. This phenomenon is commonly referred to as the "Stark effect" or "Stark shift", and the electric field which induces the shift is called the "Stark field". Where the electric field is optically induced, as by laser irradiation, the energy level shift is called an "ac Stark shift" or "optical Stark shift". Optically induced level shifts depend on the value of light intensity, and, therefore, Stark tuning can be accomplished by varying the intensity of the excitation radiation. Alternatively, an electric field can be externally applied, in which case the level shift can be either a dc or ac Stark shift, and tuning is accomplished by varying the voltage of the applied field.

Figure 1:
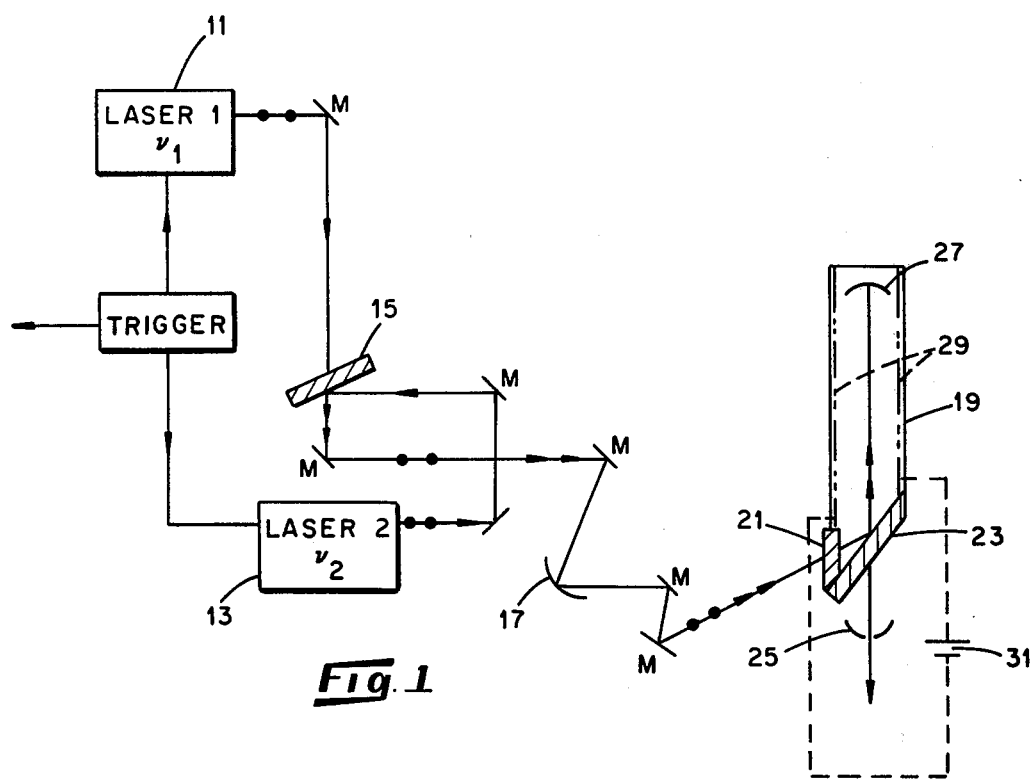
FIG. 1 is a schematic illustration of a preferred embodiment of a two-photon optically pumped gas laser in accordance with the present invention.

FIG. 1 illustrates a preferred embodiment of a two-photon optically pumped gas laser. Numerals 11 and 13 refer to two pump lasers generating laser radiation at frequencies $\nu_1$ and $\nu_2$, respectively, essentially simultaneously (that is, overlapping in time and space). The dots indicate linear polarization of the laser radiation perpendicular to the plane of the paper. Pulses from the two lasers are combined at a dielectrically coated Ge (germanium) beam splitter 15 and reflected from a curved mirror 17 which is used to mode match these beams with optical cavity 19 containing the gaseous medium, preferably $NH_3$ or $CH_3F$, generally at a vapor pressure in the range from a few tenths Torr to 20–30 Torr. The focused beams reflected from mirror 17 ultimately enter optical cavity 19 through side window 21 which is fabricated of a material suitable for transmission of the pumping radiation. The letter M designates flat mirrors for reflecting the laser beams as shown. Within cavity 19, the polarized beams are reflected from a Brewster window 23 for longitudinal polarization propagation of the generated laser lines. With the angle of beam incidence chosen appropriately, the beams are reflected from Brewster window 23 and propagate longitudinally between two reflectors 25 and 27 which define the ends of the optical cavity 19. The Brewster window is used to both reflect the laser pump radiation and transmit the generated laser radiation. The generated laser radiation is coupled from cavity 19 through a hole in reflector 25.

Instead of using a Ge beam splitter for combining the pump beams, an intracavity dispersive element such as a prism or a grating, can be used in a manner known in the art.

Figure 2:
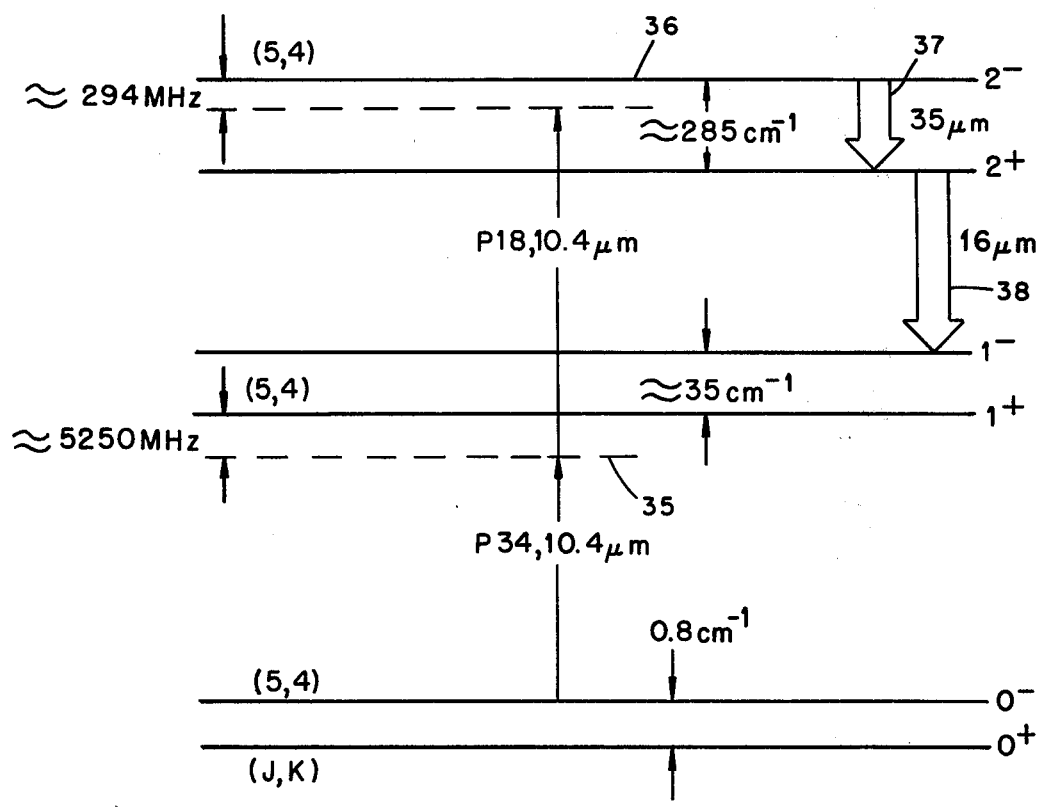
FIG. 2 is a partial energy level diagram of the $\nu_2$ vibrational mode of $^{14}NH_3$ illustrating the $NH_3$ two-photon transition involved in a specific embodiment of the invention.

The invention will be described in greater detail with respect to laser generation in the range from about 6 to about 35 $\mu$m following two-photon excitation of ammonia by a pair of $CO_2$ lasers operating on the P(34) and P(18) lines in the $CO_2$, 10.4 $\mu$m band, respectively. With the notation ($\nu_2$, J, K) the transition involved was identified as $(0^-, 5, 4) \rightarrow (2^-, 5, 4)$ and is shown in the partial energy level diagram in FIG. 2. In FIG. 2, numerals 35 and 36 represent the virtual intermediate energy level and the final absorbing state, respectively, and numerals 37 and 38 represent transitions which serve as examples of the generated laser wavelengths. Although the total energy of the two $CO_2$ laser frequencies falls short of the precise resonance energy by $\approx 0.3$ GHz the optical Stark effect can be utilized to obtain exact resonance. The saturation of the two-photon transition at 1 Torr pressure of $NH_3$ for this off-resonance condition requires that the product of the two laser intensities be $\approx 1 \times 10^{13}$ (W/cm$^2$)$^2$.

The required pump intensity constraint can be appreciably reduced (in this example $\approx 10^4$) by an externally applied electric field. This will permit use of conventionally Q-switched low-pressure $CO_2$ lasers for excitation at pulse rates approaching 1 kHz. For static Stark fields, the apparatus shown in FIG. 1 can be modified by incorporating two parallel metallic plates running the length of the active medium as shown by numeral 29. Electrical leads connected to each plate can be passed through the glass housing containing the gas to an external dc voltage source 31. Suitable voltages will provide a shifting of energy levels of the active medium via the Stark effect as is known in the art.

Specifically, using an apparatus configuration as in FIG. 1, the TEM$_{00}$ (Transverse Electric Magnetic fields) modes from two high-repetition-rate grating-tuned TEA (Transversely Excited Atmospheric) $CO_2$ lasers (Lumonics 801A) were combined by a dielectrically coated Ge beam splitter. The P(34) and P(18) laser pulses had energies of $\approx 10$ and $\approx 24$ mJ, respectively, upon entering the $NH_3$ cavity. These outputs yielded a power product of $\approx 2 \times 10^{13}$ (W/cm$^2$)$^2$ at the beam waist of the ammonia cell. A mirror having a radius of curvature of 2 m was used to mode-match these beams with the ammonia laser cavity which consisted of two gold-coated curved mirrors each having a radius of curvature of 0.5 m and separated by 93.3 cm. Input coupling was accomplished by transmitting the polarized $CO_2$ beams through a NaCl window and reflecting them from a KRS-5 (thallium bromoiodide) flat placed at Brewster's angle for the ammonia resonator. Measurements indicated that $\approx 45\%$ of the energy incident on the Brewster window was focused into the $NH_3$ cell. The KRS-5 flat enforces a polarization on the ammonia laser which is perpendicular to that of the incident $CO_2$ beams. The generated laser radiation was coupled from the cavity through a 1-mm-diam hole in one of the gold mirrors (25 in FIG. 1).

Stimulated emission was observed at ten different wavelengths subsequent to two-photon pumping the 2 $\nu_2^-(5,4)$ level at 2115.88 cm$^{-1}$. The following laser wavelengths were indentified: in the $\nu_2$ mode — 12.11, 13.72, 15.88, 15.95, 18.93, 19.55, 26.10, and 35.50 $\mu$m; in the $\nu_4$ mode — 6.27 and 6.69 $\mu$m, with the latter two lines corresponding to transitions between 1 $\nu_4^+(2,2) \rightarrow 0^-$ and 1 $\nu_4^+(8,1) \rightarrow 0^-$, respectively. Some of these laser transitions, along with their probable state designations, are depicted in FIG. 3.

Figure 3:
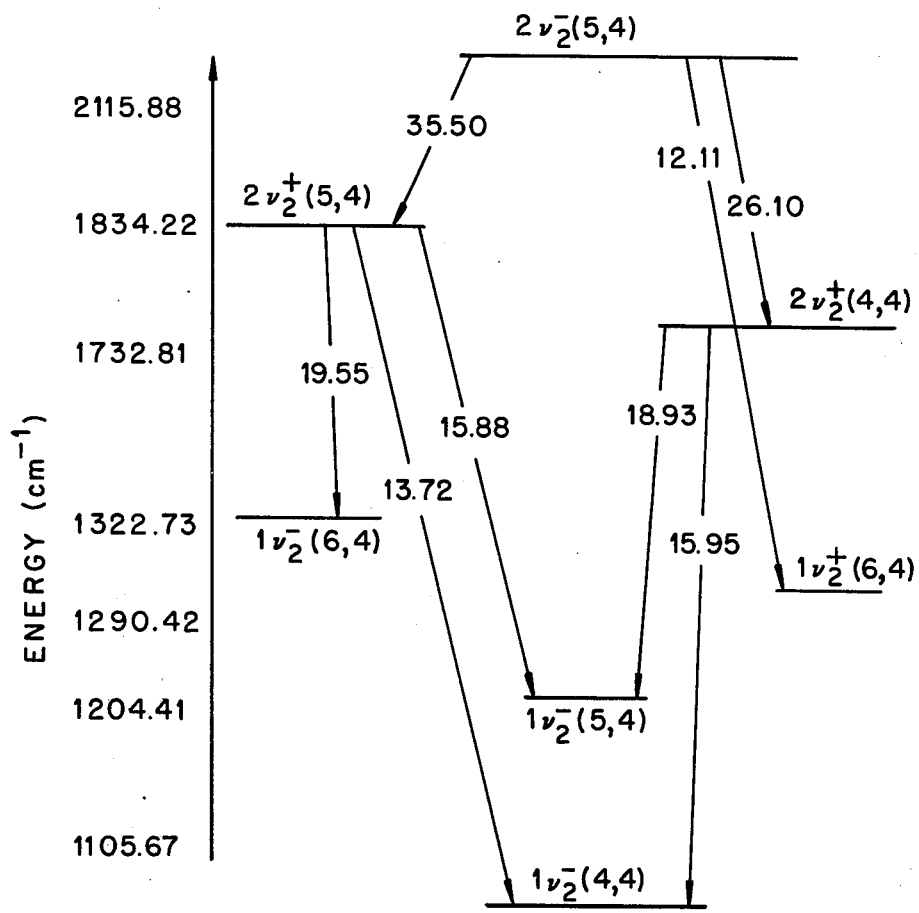
FIG. 3 graphically illustrates observed laser lines in the $\nu_2$ vibrational mode of $^{14}NH_3$.

As shown in FIG. 3, three of the ammonia laser lines utilize the 2 $\nu_2^-(5,4)$ level as their initial state. Five other lines have upper levels which are pumped in turn by the indicated 35.50- and 26.10- $\mu$m laser transitions. The unusually large vibrational matrix element for the $2^- \rightarrow 2^+$ transition ($\approx 0.83$ D) produces an enormous gain ($\approx 3$ cm$^{-1}$) on the 35.50- and 26.10- $\mu$m lines causing these levels to be strongly coupled by stimulated emission which selectively populates the $2\nu_2^+$ states. The remaining two lines in the $^{14}$NH$_3$, $\nu_4$ mode at 6.27 and 6.69 $\mu$m occur most probably as a direct consequence of collisional coupling between the Coriolis-coupled $2\nu_2$ and $1\nu_4$ ammonia vibrational modes. The transitions at 12.11 $\mu$m and 26.10 $\mu$m were observed to be the strongest. Peak laser power occurred between 700 mTorr and 7 Torr ammonia vapor pressure.

Using an apparatus configuration as shown in FIG. 1, laser action was attained in $^{12}$CH$_3$F at 9.75 $\mu$m subsequent to two-photon excitation by a pair of CO$_2$ TEA lasers. Two-photon absorption between the ($\nu_3$, $J$, $K$) = (0,1,1) and (2,3,1) vibrational levels in $^{12}$CH$_3$F was induced by a pair of grating-tuned CO$_2$ TEA lasers operating on the P(14) and P(30) lines of the 9.4 $\mu$m CO$_2$ band. Laser action occurred between the (2,3,1) and (1,4,1) states at 9.75 $\mu$m. Optimal CH$_3$F pressure was 2 Torr. Other possible laser lines originating from the (2,3,1) level are $2\nu_3 \rightarrow \nu_2$ at 16 $\mu$m and $2\nu_{-3} \rightarrow \nu_6$ at 11 $\mu$m which, having lower gains than the generated 9.75 $\mu$m line require that the gain at 9.75 $\mu$m first be greatly reduced such as by selectively absorbing gas(es) placed in the lasing medium.

New laser lines in addition to the ones already observed can be produced by extensions of the laser generation technique hereinbefore described. For example, new laser lines can be generated by the use of frequencies other than those designated in the examples. Since optical selection rules are rigorously maintained in the laser emission process, new frequencies will be generated as a consequence of populating different upper vibration levels using the different pumping frequencies. In particular, the P(34) and P(14) lines of the 10.4 $\mu$m band can be used for two-photon pumping of $^{14}$NH$_3$. These lines involve the J=4, K=4 and J=2, K=2 substates of the $\nu_2$ mode in $^{14}$NH$_3$, whereas the P(34) and P(18) lines used in the above example excited the $2\nu_2^+$(J=5,K=4) level.

For a given pair of excitation frequencies, new laser lines which are otherwise inaccessible by the techniques discussed above, can be generated by using a buffer gas to transfer excited state populations into particular energy levels of the lasing gas that are inaccessible by the optical processes described. In turn, the emissions from the collisionally-populated levels would generate additional new laser frequencies. Either polar or non-polar molecules may be used as buffers.

The hereinbefore described laser generation technique using two-photon absorption is also applicable to atomic gaseous media. The present lasers are particularly suitable as highly sensitive probes to study the collisional properties of highly excited molecular vibrational states. They may also be used as optical sources for photochemical processes and laser isotope separation processes.

The invention has been described herein with reference to preferred embodiments and specific examples. However, it will be apparent to those skilled in the art that many other modifications and variations are possible without departing from the spirit and scope of the invention as defined by the following claims.

What we claim is:

1. A method for producing laser radiation which comprises:
    providing a gaseous medium selected from the group consisting of NH$_3$ and CH$_3$F,
    optically pumping a two-photon transition by means of a pair of photon sources operating essentially simultaneously and having a combined photon energy sufficient to excite a final absorbing state by two photon absorption corresponding to said two-photon transition and cause a population inversion in the gaseous medium, and
    stimulating the emission of coherent radiation from the inverted level.

2. A method according to claim 1 wherein the pair of photon sources is a pair of lasers.

3. A method according to claim 2 further including tuning the two-photon transition to exact resonance by Stark tuning.

4. A method according to claim 2 wherein the pair of lasers is a pair of CO$_2$ lasers.

5. A method according to claim 1 wherein the gaseous medium is NH$_3$.

6. A method according to claim 5 wherein the pair of photon sources is a pair of CO$_2$ lasers operating in the 10.4 micrometer band.

7. A method according to claim 6 further including tuning the two-photon transition to exact resonance by Stark tuning.

8. A method according to claim 7 wherein the first of said pair of CO$_2$ lasers operates on the P(34) line and the second of said pair of CO$_2$ lasers operates on the P(18) line.

9. A method according to claim 8 wherein the wavelength of the generated laser radiation is in the range from about 6 micrometers to about 35 micrometers.

10. A method according to claim 9 wherein the wavelength of the generated laser radiation is selected from the group consisting of 6.27, 6.69, 12.11, 13.72, 15.88, 15.95, 18.93, 19.55, 26.10, and 35.50 micrometers.

11. A method according to claim 1 wherein the gaseous medium is CH$_3$F.

12. A method according to claim 11 wherein the pair of photon sources is a pair of CO$_2$ lasers operating in the 9.4 micrometer band.

13. A method according to claim 12 further including tuning the two-photon transition into exact resonance by Stark tuning.

14. A method according to claim 13 wherein the first of said pair of CO$_2$ lasers operates on the P(14) line and the second of said pair of CO$_2$ lasers operates on the P(30) line.

15. Apparatus for generating laser radiation which comprises:
    a container,
    a molecular gaseous medium selected from the group consisting of NH$_3$ or CH$_3$F contained within said container,
    means forming with said container an optical resonant cavity, said means for two-photon optically pumping an excited energy level in said gaseous medium, thereby forming an active laser medium.

16. Apparatus according to claim 15 wherein the pumping means comprises a pair of lasers, means for combining the beams from said pair of lasers into a single excitation beam, and means for coupling said single input beam with the gaseous medium to form an active laser medium.

17. Apparatus according to claim 16 wherein said beam combining means is a beam splitter.

18. Apparatus according to claim 16 wherein the input beam coupling means includes:

a brewster window intermediate the ends of said optical resonant cavity for receiving and reflecting the input beams for longitudinal propagation between said ends, and means for directing the input beam on to said brewster window such that the angle of incidence is suitable for said longitudinal propagation.

19. Apparatus according to claim 18 wherein said pair of lasers is a pair of $CO_2$ lasers.

20. Apparatus according to claim 19 wherein said gaseous medium is $CH_3F$.

21. Apparatus according to claim 18 wherein said gaseous medium is $NH_3$.

22. Apparatus according to claim 16 further including means for the external application of an electric field across said gaseous medium.

* * * * *